(12) United States Patent
Banga et al.

(10) Patent No.: US 10,182,045 B2
(45) Date of Patent: Jan. 15, 2019

(54) METHOD, SYSTEM, AND PROGRAM STORAGE DEVICE FOR MANAGING TENANTS IN AN INDUSTRIAL INTERNET OF THINGS

(71) Applicant: General Electric Company, Schenectady, NY (US)

(72) Inventors: Vineet Banga, San Ramon, CA (US); Vipul Parmar, San Ramon, CA (US); Ilya Lipkind, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 141 days.

(21) Appl. No.: 15/077,885

(22) Filed: Mar. 22, 2016

(65) Prior Publication Data

US 2017/0222999 A1  Aug. 3, 2017

Related U.S. Application Data

(60) Provisional application No. 62/288,951, filed on Jan. 29, 2016.

(51) Int. Cl.
*H04L 29/06* (2006.01)

(52) U.S. Cl.
CPC ............. *H04L 63/08* (2013.01); *H04L 63/10* (2013.01)

(58) Field of Classification Search
CPC ......... H04L 63/08; H04L 63/10; H04L 67/42; H04L 63/102
See application file for complete search history.

(56) References Cited

U.S. PATENT DOCUMENTS

| | | | |
|---|---|---|---|
| 2011/0295645 A1* | 12/2011 | Barros | G06Q 10/06316 705/7.26 |
| 2016/0104005 A1* | 4/2016 | Toussaint | G06F 21/6218 707/783 |
| 2016/0335731 A1* | 11/2016 | Hall | G06Q 50/163 |
| 2017/0006135 A1* | 1/2017 | Siebel | H04L 67/02 |
| 2017/0019264 A1* | 1/2017 | Nugent | H04L 12/282 |
| 2017/0060574 A1* | 3/2017 | Malladi | G06F 8/70 |
| 2017/0161501 A1* | 6/2017 | Sood | G06F 21/575 |
| 2017/0208151 A1* | 7/2017 | Gil | H04L 67/34 |
| 2017/0255373 A1* | 9/2017 | Bruno | G06F 3/04847 |
| 2017/0295057 A1* | 10/2017 | Dost | H04L 67/12 |

* cited by examiner

*Primary Examiner* — Mohammad A Siddiqi
(74) *Attorney, Agent, or Firm* — Fitch, Even, Tabin & Flannery LLP

(57) ABSTRACT

In an example embodiment, a method, system, and program storage device for binding an industrial application to a plurality of services in an Industrial Internet of Things (IIoT) is provided. For each of a plurality of tenants, a service template corresponding to a group in which the corresponding tenant belongs is retrieved and an instance of the industrial application is instantiated for the corresponding tenant. Then, at runtime of an instance of the industrial application, a number of actions are taken. A request by the instance of the industrial application for a service identified by a first service name is detected. Then a credential for the service name is retrieved, with the credential identifying a location where an instance of the service identified by the first service name resides. The service identified by the first service name is then dynamically called using the location.

14 Claims, 10 Drawing Sheets

| APP | SPACE_ID | TENANT_NAME | TENANT_ID | SERVICE_NAME | SERVICE_INSTANCE_ID | CREDENTIAL | SCOPE |
|---|---|---|---|---|---|---|---|
| APM | 6FF3E934-1AEA-... | PGS | 03039439-7BA2-... | IIOT-ASSET | 20ADAEB6-FEA8-... | {"URL":"HTTP://20ADAEB6-FEA8-...IIOT-ASSET.IIOT.IO", "HEADER":"20ADAEB6-FEA8-..."} | IIOT-ASSET.APM.20ADAEB6 |
| APM | 6FF3E934-1AEA-... | PGS | 03039439-7BA2-... | IIOT-VIEW | 6F77C38B-60A6-... | {"URL":"HTTP://6F77C38B-60A6-...IIOT-VIEW.IIOT.IO", "HEADER":"6F77C38B-60A6-..."} | IIOT-VIEW.APM.6F77C38B-60A6 |
| APM | 6FF3E934-1AEA-... | PGS | 2EA0833F-5B29-... | IIOT-ASSET | 755C0CFE-EAC5-... | {"URL":"HTTP://755C0CFE-EAC5-...IIOT-ASSET.IIOT.IO", "HEADER":"755C0CFE-EAC5-..."} | IIOT-ASSET.APM.755C0CFE-EAC5 |
| APM | 6FF3E934-1AEA-... | PGS | 2EA0833F-5B29-... | IIOT-VIEW | F8C79B42-CE50-... | {"URL":"HTTP://F8C79B42-CE50-...IIOT-VIEW.IIOT.IO", "HEADER":"F8C79B42-CE50-..."} | IIOT-VIEW.APM.F8C79B42-CE50 |

*FIG. 5*

METHOD, SYSTEM, AND PROGRAM STORAGE DEVICE FOR MANAGING TENANTS IN AN INDUSTRIAL INTERNET OF THINGS

CLAIM OF PRIORITY

This application claims the benefit of priority under 35 U.S.C. § 119(e) to U.S. Provisional Patent Application Ser. No. 62/288,951, filed on Jan. 29, 2016, the benefit of priority of which is claimed hereby, and which is incorporated by reference herein in its entirety.

TECHNICAL FIELD

This application relates generally to industrial equipment. More particularly, this application relates to managing tenants in an industrial Internet of Things.

BACKGROUND

The traditional Internet of Things (IoT) involves the connection of various consumer devices, such as coffee pots and alarm clocks, to the Internet to allow for various levels of control and automation of those devices. The Industrial Internet of Things (IIoT), on the other hand, involves connecting industrial assets as opposed to consumer devices. There are technical challenges involved in interconnecting diverse industrial assets, such as wind turbines, jet engines, and locomotives, that simply do not exist in the realm of consumer devices.

BRIEF DESCRIPTION OF DRAWINGS

The present disclosure is illustrated by way of example and not limitation in the figures of the accompanying drawings, in which like references indicate similar elements and in which:

FIG. 5 is a diagram illustrating an example tenant registry, in accordance with an example embodiment.

DETAILED DESCRIPTION

Overview

The description that follows includes illustrative systems, methods, techniques, instruction sequences, and machine-readable media (e.g., computing machine program products) that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

In an example embodiment, a new concept of tenant is introduced for the purposes of IIoT implementations. Specifically, each tenant is comprised not just of a customer but also of a bundle of services. In an example embodiment, this new concept of tenant is implemented using templates. These templates can be defined broadly or narrowly. Specifically, there could be one template used for all tenants or different templates used for different configurations of groups of tenants (e.g., one template for industrial customers, one template for commercial customers, or alternatively grouped by industry, etc.). Furthermore, the resolution of service instance credentials can be performed at runtime, allowing for alterations in the instantiations/bindings to occur without requiring restarting the application.

Some of the technical challenges involved in an IIoT include items such as predictive maintenance, where industrial assets can be serviced prior to problems developing to reduce unplanned downtimes. As such, one such technical challenge involves prediction of when industrial assets or parts thereon will fail. In an example embodiment, an IIoT may be designed that monitors data collected from sensors and, using physics-based analytics, detects potential error conditions based on an asset model. The asset in question can then be gracefully shut down for maintenance at the appropriate time. In addition to these types of edge applications (applications involving the industrial assets directly), the IIoT may also pass the sensor data to a cloud environment where operational data for all similar machines under management can be stored and analyzed. Over time, data scientists can discover new patterns and create new and improved physics-based analytical models. The new analytical model can then be pushed back to all of the assets, effectively improving the performance of all assets simultaneously.

Figure 1:
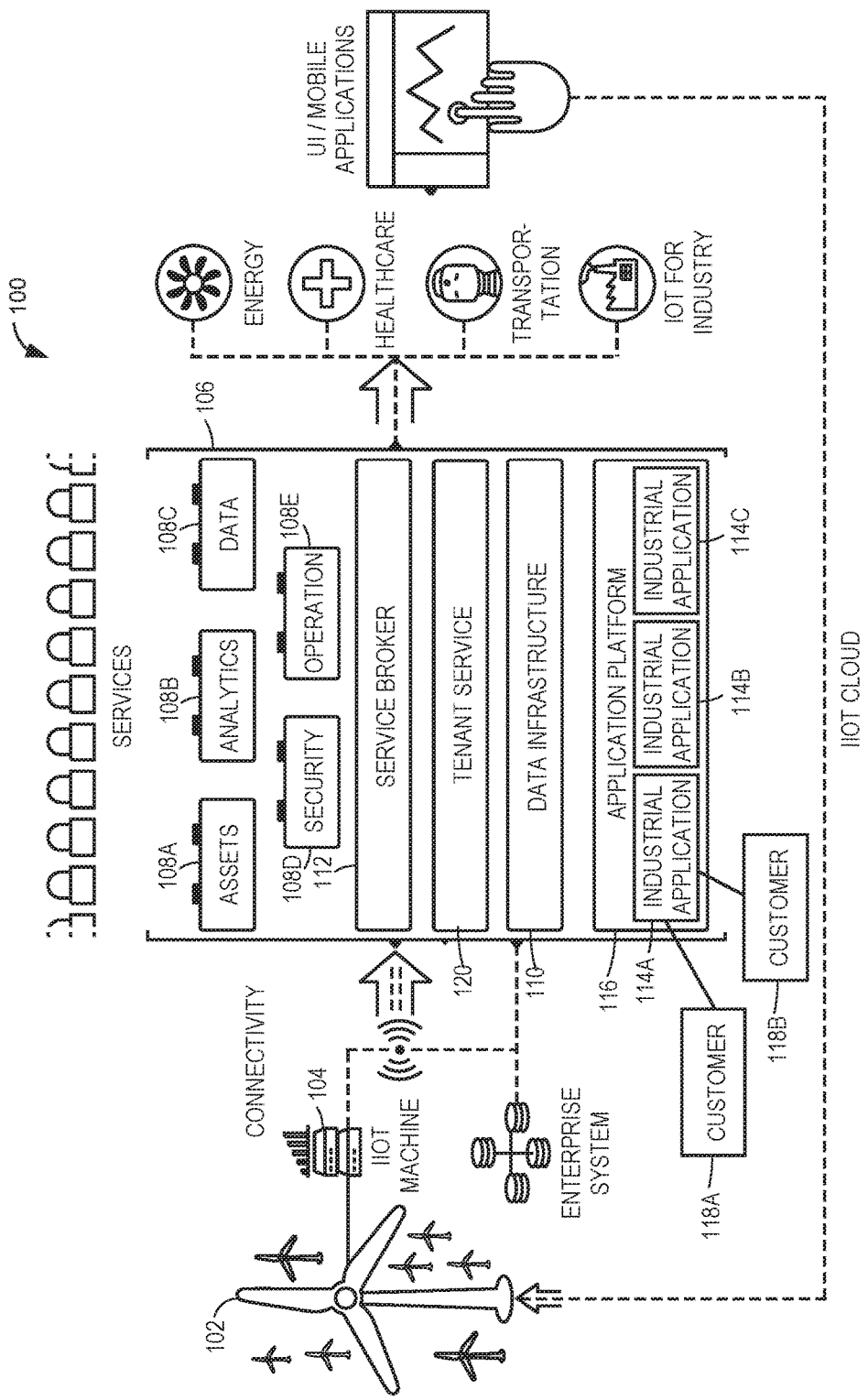
FIG. 1 is a block diagram illustrating a system, in accordance with an example embodiment, implementing an IIoT.

FIG. 1 is a block diagram illustrating a system 100, in accordance with an example embodiment, implementing an IIoT. An industrial asset 102, such as a wind turbine as depicted here, may be directly connected to an IIoT machine 104. The IIoT machine 104 is a software stack that can be embedded into hardware devices such as industrial control systems or network gateways. The software stack may include its own software development kit (SDK). The SDK includes functions that enable developers to leverage the core features described below.

One responsibility of the IIoT machine 104 is to provide secure, bi-directional cloud connectivity to, and management of, industrial assets, while also enabling applications (analytical and operational services) at the edge of the IIoT. The latter permits the delivery of near-real-time processing in controlled environments. Thus, the IIoT machine 104 connects to an IIoT cloud 106, which includes various modules, including asset module 108A, analytics module 108B, data module 108C, security module 108D, and operations module 108E, as well as data infrastructure 110. This allows other computing devices, such as client computers, running user interfaces/mobile applications to perform various analyses of either the individual industrial asset 102 or assets of the same type.

The IIoT machine 104 also provides security, authentication, and governance services for endpoint devices. This allows security profiles to be audited and managed centrally across devices, ensuring that assets are connected, controlled, and managed in a safe and secure manner, and that critical data is protected.

Figure 2:
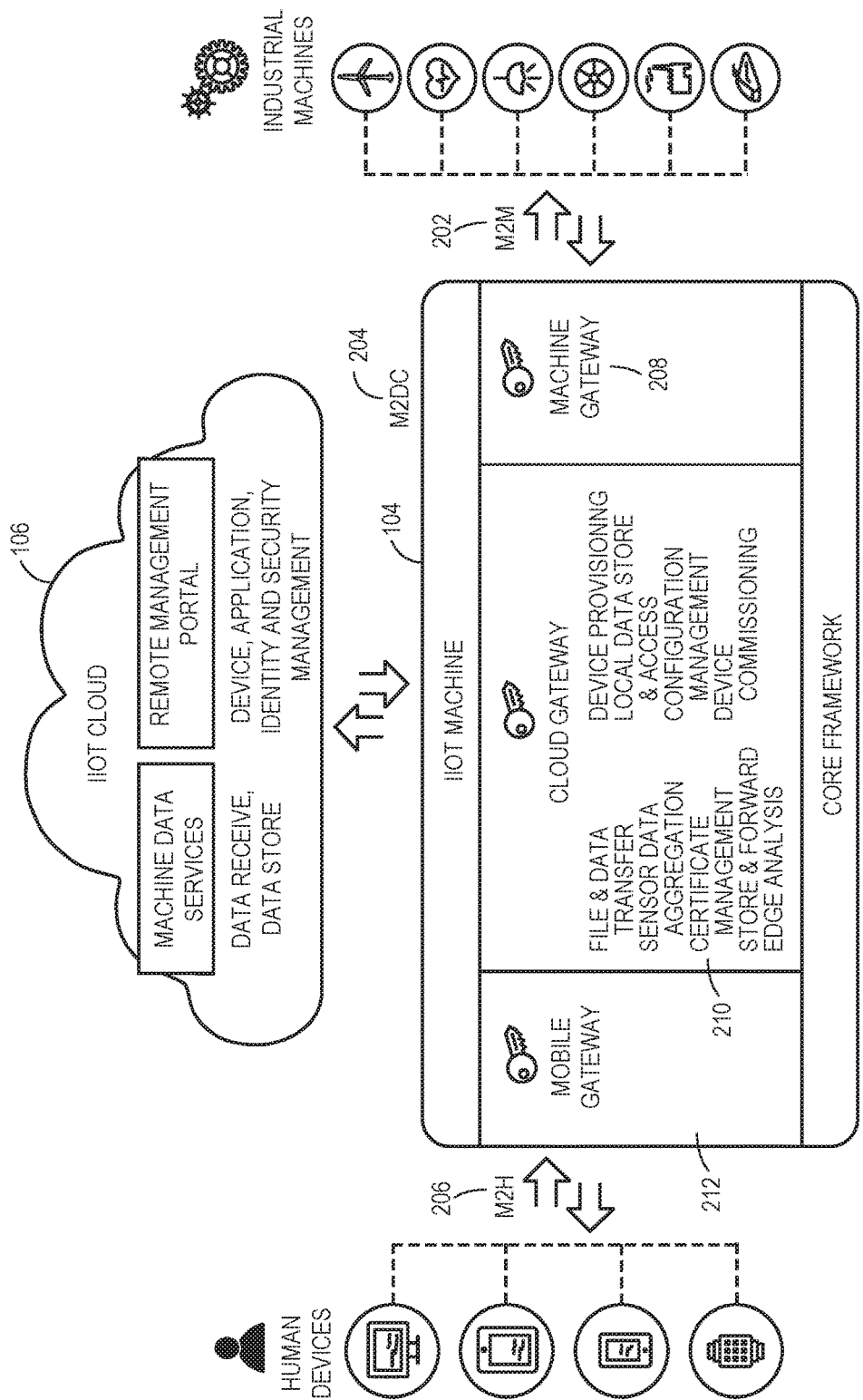
FIG. 2 is a block diagram illustrating different edge connectivity options that an IIoT machine provides, in accordance with an example embodiment.

In order to meet requirements for industrial connectivity, the IIoT machine 104 can support gateway solutions that connect multiple edge components via various industry standard protocols. FIG. 2 is a block diagram illustrating different edge connectivity options that an IIoT machine 104 provides, in accordance with an example embodiment. There are generally three types of edge connectivity options that an IIoT machine 104 provides: machine gateway (M2M) 202, cloud gateway (M2DC) 204, and mobile gateway (M2H) 206.

Many assets may already support connectivity through industrial protocols such as Open Platform Communication (OPC)-UA or ModBus. A machine gateway component 208 may provide an extensible plug-in framework that enables connectivity to assets via M2M 202 based on these common industrial protocols.

A cloud gateway component 210 connects an IIoT machine 104 to an IIoT cloud 106 via M2DC.

A mobile gateway component 212 enables people to bypass the IIoT cloud 106 and establish a direct connection to an asset 102. This may be especially important for maintenance scenarios. When service technicians are deployed to maintain or repair machines, they can connect directly from their machine to understand the asset's operating conditions and perform troubleshooting. In certain industrial environments, where connectivity can be challenging, the ability to bypass the cloud and create this direct connection to the asset may be critical.

As described briefly above, there are a series of core capabilities provided by the IIoT system 100. Industrial scale data, which can be massive and is often generated continuously, cannot always be efficiently transferred to the cloud for processing, unlike data from consumer devices. Edge analytics provide a way to preprocess the data so that only the pertinent information is sent to the cloud. Various core capabilities provided include file and data transfer, store and forward, local data store and access, sensor data aggregation, edge analytics, certificate management, device provisioning, device decommissioning, and configuration management.

As described briefly above, the IIoT machine 104 can be deployed in various different ways. These include on the gateway, on controllers, or on sensor nodes. The gateway act as a smart conduit between the IIoT cloud 106 and the asset(s) 102. The IIoT machine 104 may be deployed on the gateway device to provide connectivity to assets) 102 via a variety of protocols.

The IIoT machine 104 can be deployed directly onto machine controller units. This decouples the machine software from the machine hardware, allowing connectivity, upgradability, cross-compatibility, remote access, and remote control. It also enables industrial and commercial assets that have traditionally operated standalone or in very isolated networks to be connected directly to the IIoT cloud 106 for data collection and live analytics.

The IIoT machine 104 can be deployed on sensor nodes. In this scenario, the intelligence lives in the IIoT cloud 106 and simple, low-cost sensors can be deployed on or near the asset(s) 102. The sensors collect machine and environmental data and then backhaul this data to the IIoT cloud 106 (directly or through an IIoT gateway), where it is stored, analyzed, and visualized.

Customers or other users may create applications to operate in the IIoT cloud 106. While the applications reside in the IIoT cloud 106, they may rely partially on the local IIoT machines 104 to provide the capabilities to gather sensor data, process it locally, and then push it to the IIoT cloud 106.

The IIoT cloud 106 enables the IIoT by providing a scalable cloud infrastructure that serves as a basis for platform-as-a-service (PaaS), which is what developers use to create Industrial Internet applications for use in the IIoT cloud.

Referring back to FIG. 1, services provided by the IIoT cloud and generally available to applications designed by developers include asset services from asset module 108A, analytics services from analytics module 108B, data services from data module 108C, application security services from security module 108D, and operational services from operations module 108E.

Asset services include services to create, import, and organize asset models and their associated business rules. Data services include services to ingest, clean, merge, and ultimately store data in the appropriate storage technology so that it can be made available to applications in the manner most suitable to their use case.

Analytics services include services to create, catalog, and orchestrate analytics that will serve as the basis for applications to create insights about industrial assets. Application security services include services to meet end-to-end security requirements, including those related to authentication and authorization.

Operational services enable application developers to manage the lifecycle and commercialization of their applications. Operational services may include development operational services, which are services to develop and deploy Industrial Internet applications in the cloud, as well as business operational services, which are services that enable transparency into the usage of Industrial Internet applications so that developers can ensure profitability.

The asset model may be the centerpiece of many, if not all, Industrial Internet applications. While assets are the instantiations of asset types (types of industrial equipment, such as turbines), the asset model is a digital representation of the asset's structure. In an example embodiment, the asset service provides Application Program Interfaces (APIs), such as Representational State Transfer (REST) APIs that enable application developers to create and store asset models that define asset properties, as well as relationships between assets and other modeling elements. Application developers can then leverage the service to store asset-instance data. For example, an application developer can create an asset model that describes the logical component structure of all turbines in a wind farm and then create instances of that model to represent each individual turbine. Developers can also create custom modeling objects to meet their own unique domain needs.

In an example embodiment, the asset module 108A may include an API layer, a query engine, and a graph database. The API layer acts to translate data for storage and query in the graph database. The query engine enables developers to use a standardized language, such as Graph Expression Language (GEL), to retrieve data about any object or property of any object in the asset service data store. The graph database stores the data.

An asset model represents the information that application developers store about assets, how assets are organized, and how they are related. Application developers can use the asset module 108A APIs to define a consistent asset model and a hierarchical structure for the data. Each piece of physical equipment may then be represented by an asset instance. Assets can be organized by classification and by any number of custom modeling objects. For example, an organization can use a location object to store data about where its pumps are manufactured, and then use a manufacturer object to store data about specific pump suppliers. It can also use several classifications of pumps to define pump types, assign multiple attributes, such as Brass or Steel, to each classification, and associate multiple meters, such as Flow or Pressure, to a classification.

Data services from the data module 108C enable industrial Internet application developers to bring data into the system and make it available for their applications. This data may be ingested via an ingestion pipeline that allows for the data to be cleansed, merged with data from other data sources, and stored in the appropriate type of data store, whether it be a time series data store for sensor data, a Binary Large Object (BLOB) store for medical images, or a relational database management system (RDBMS).

Since many of the assets are industrial in nature, much of the data that will commonly be brought into the IIoT system 100 for analysis is sensor data from industrial assets. In an example embodiment, a time series service may provide a query efficient columnar storage format optimized for time series data. As the continuous stream of information flows from sensors and needs to be analyzed based on the time aspect, the arrival time of each stream can be maintained and indexed in this storage format for faster queries. The time series service also may provide the ability to efficiently ingest massive amounts of data based on extensible data models. The time series service capabilities address operational challenges posed by the volume, velocity, and variety of IIoT data, such as efficient storage of time series data, indexing of data for quick retrieval, high availability, horizontal scalability, and data point precision.

The application security services provided by the security module 108D include user account and authentication (UAA) and access control. The UAA service provides a mechanism for applications to authenticate users by setting up a UAA zone. An application developer can bind the application to the UAA service and then use services such as basic login and logout support for the application, without needing to recode these services for each application. Access control may be provided as a policy-drive authorization service that enables applications to create access restrictions to resources based on a number of criteria.

Thus, a situation arises where application developers wishing to create industrial applications for use in the IIoT may wish to use common services that many such industrial applications may use, such as a log-in page, time series management, data storage, and the like. The way a developer can utilize such services is by instantiating instances of the services and then having their applications consume those instances. Typically, many services may be so instantiated.

There is a desire among developers to develop applications that are capable of being multi-tenant. Multi-tenant applications allow for different customers of the application to "share" the application (in the cloud), while having their respective data kept private from each other (called "isolation"), Thus, in such circumstances, an application developer may need to instantiate different instances of each service used by the application for the different customers. Thus, if an application is designed to consume four IIoT cloud services, and the application has two different customers, the application developer must eventually instantiate eight different instances. This can be very time consuming and resource intensive. Each instance must be instantiated and then bound to the application. Additionally, once the bindings are complete, the application needs to be restarted, which causes downtime. Thus, if a new tenant/customer is added to an application, the application developer not only needs to instantiate four new instances for the services and bind them to the application, but also cause downtime for the application in order to restart the application for all tenants to ensure that the changes take effect.

In an example embodiment, a new concept of tenant is introduced for the purposes of IIoT implementations. Specifically, each tenant is comprised not just of a customer but also of a bundle of services.

In an example embodiment, this new concept of tenant is implemented using templates. These templates can be defined broadly or narrowly. Specifically, there could be one template used for all tenants, or different templates used for different configurations of groups of tenants (e.g., one template for industrial customers, one template for commercial customers, or alternatively grouped by industry, etc.).

Furthermore, the resolution of service instance credentials can be performed at runtime, allowing for alterations in the instantiations/bindings to occur without requiring restarting the application.

Referring back to FIG. 1, the instantiations and bindings may be performed using a service broker 112. Applications 114A-114C, which are created by a developer and run on the cloud, may be hosted by application platform 116.

Customers 118A-118*b* may then interact with applications 114A-114C to which they have subscribed. Here, for illustrative purposes, customers 118A and 118B are both tenants of application 114A. A tenant service 120 may be used to manage tenant-related modifications, such as management of templates and creation of tenants.

Figure 3:
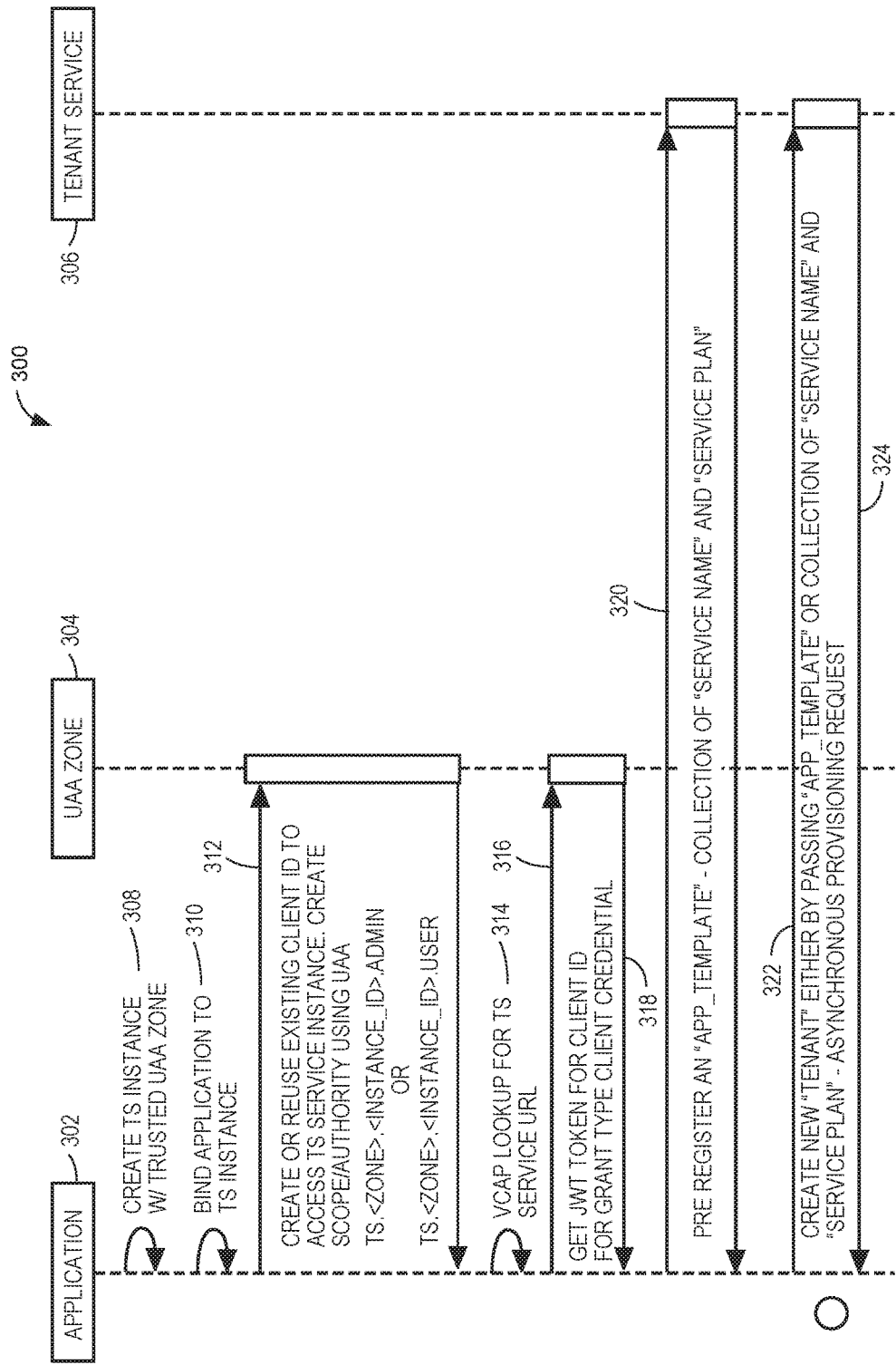
FIG. 3 is an interaction diagram illustrating a method of establishing a new tenant.
Figure 3:
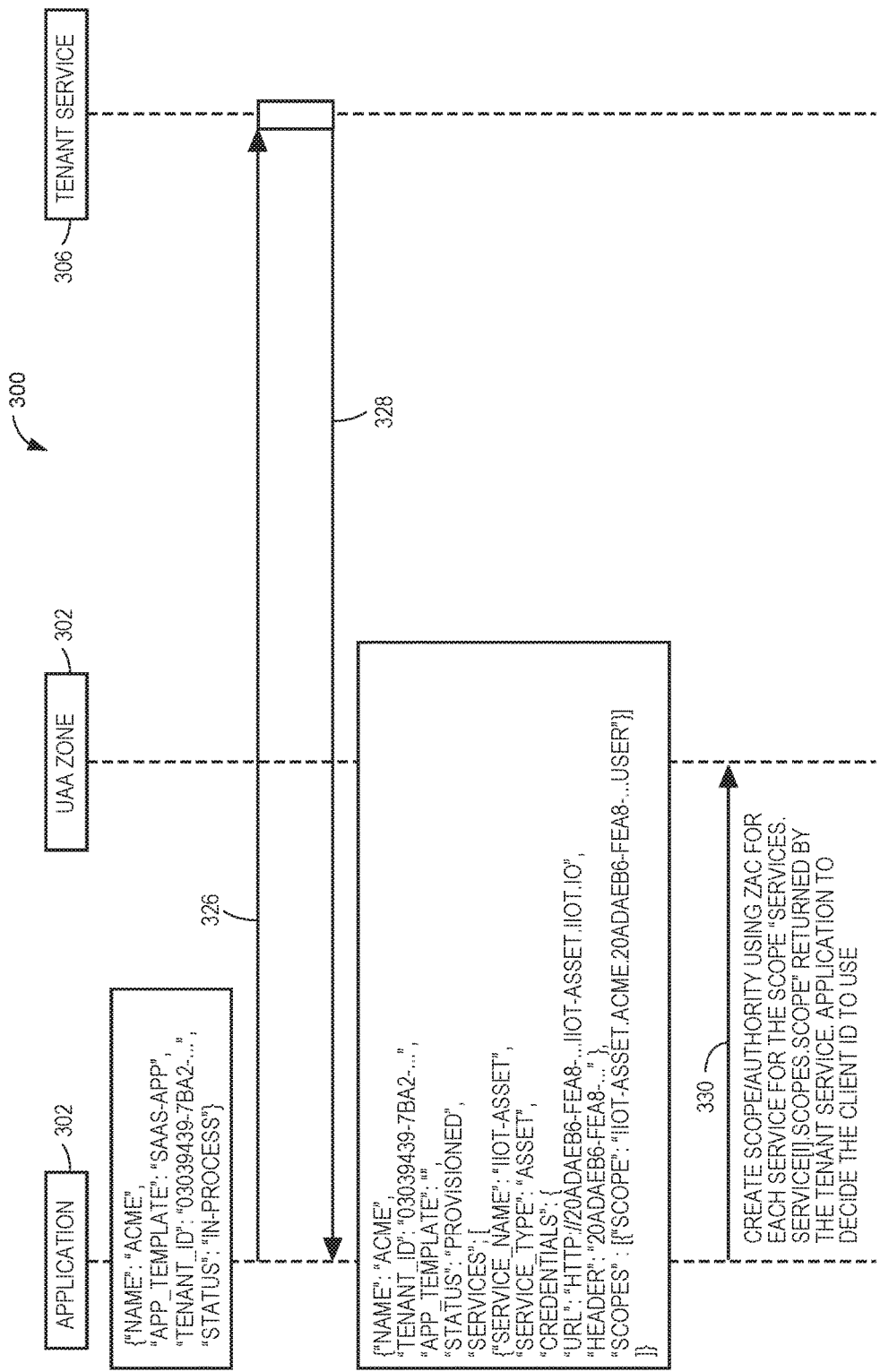

FIG. 3 is an interaction diagram illustrating a method 300 of establishing a new tenant. The method utilizes an application 302, a UAA zone 304, and a tenant service instance 306. At operation 308, the tenant service instance 306 is created by the application 302. At operation 310, the application is bound to the tenant service instance 306. At operation 312, a client identification (ID) is created (or an existing one reused) to access the tenant service instance 306, and registered with the UAA zone 304.

At operation 314, a lookup is performed to locate the tenant service instance location. At operation 316, credentials for the client ID are requested from the UAA zone 304, which are returned at operation 318.

At operation 320, a service template is defined by the application 302 on the tenant service 306. At operation 322, an identification for this template is returned to the application 302. The template comprises a collection of service names and service plans and thus may be created by the application 302 specifying these items to the tenant service 306. At operation 322, a new tenant is created by the application 302 on the tenant service 306 by passing the template identification to the tenant service 306. It should be noted that in some example embodiments, the application 302 need not pre-register the template and the template can simply be created at operation 322 by the application 302 providing the service names and service plans at that time.

At operation 324, a notification that the provisioning of the tenant is in process is sent to the application 302 by the tenant service. For example, this notification may be in the following format:

```
{"name": "acme",
 "app_template": "saas-app",
 "tenant_id": "03039439-7ba2-...",
 "status": "in-process"}
```

At operation 326, the application 302 may periodically or continuously poll for the status of the provisioning. At operation 328, the tenant service 306 may notify the application 302 that the tenant has been provisioned. For example, this notification may be in the following format:

```
{"name": "acme",
 "tenant_id": "03039439-7ba2-...",
 "app_template": "",
 "status": "provisioned",
 "services": [
   { "service_name": "predix-asset",
   "service_type": "asset",
   "credentials": {
     "url": "http:/120adaeb6-tea8-...predix-asset.predix.io",
     "header": "20adaeb6-fea8-..."},
   "scopes" : [{ "scope":"predix-asset.acme.20acaeb6-fea8-...user" }]
 }]}
```

At operation 330, the application 302 may create the scope/authority for each service for a scope returned by the tenant service 306 in the notification in operation 328.

Figure 4:
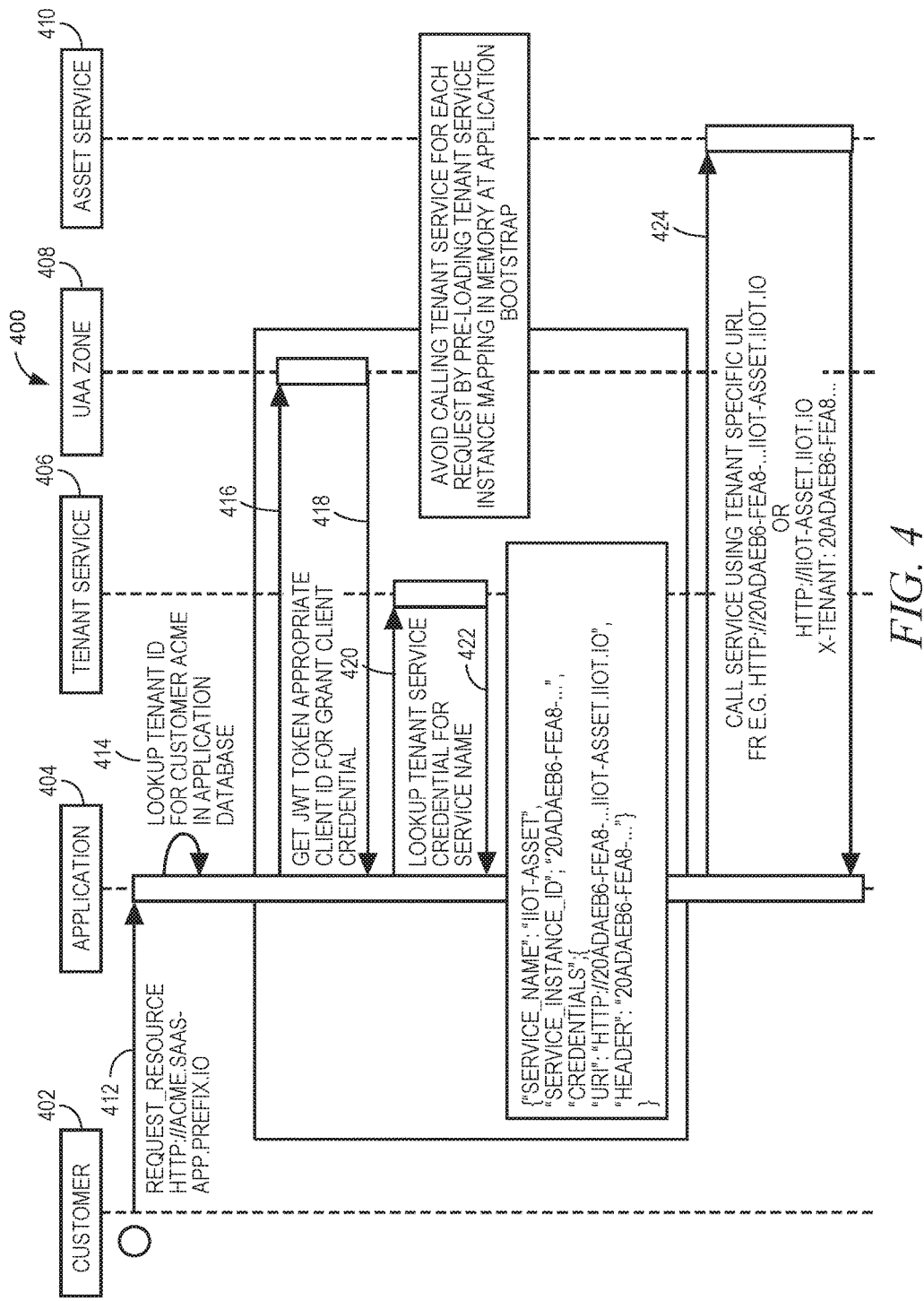
FIG. 4 is an interaction diagram illustrating a method, in accordance with an example embodiment, of providing tenant service access.

FIG. 4 is an interaction diagram illustrating a method 400, in accordance with an example embodiment, of providing tenant service access. The method 400 may utilize a customer 402, an application 404, a tenant service 406, a UAA zone 408, and an asset service 410. In some example embodiments the application 404 may be the same application as application 302, the tenant service 406 may be the same service as tenant service 306, and the UAA zone 408 may be the same zone as UAA zone 304. At operation 412, the customer 402 may request a resource from the application 404. This resource may utilize a service and the request may include an identification of the service. At operation 414, the application 404 may lookup a tenant identification for the customer 402 in an application database. At operation 416, the application 404 may request credentials for the client from the UAA zone 408. At operation 418, these credentials may be returned.

At operation 420, the application 404 may look up a tenant service credential for the service name. At operation 422, the credential for the service name is returned. For example, this credential may be in the following format:

```
{"service_name": "predix-asset",
 "service_instance_id": "20adaeb6-fea8-...",
 "credentials": {
   "url": http://20adaeb6-tea8-...predix-asset.predix.io,
   "header": "20adaeb6-fea8-..."}
}
```

As can be seen, this credential includes a location of a tenant specific instance of the service. At operation 424, the application may call the tenant specific instance from asset service 410 using this location. Thus, because the location is retrieved at runtime, and specifically at the time the resource/service is requested, it is not necessary to restart the application for a binding to take effect; essentially, the application 404 has been dynamically bound to the service instance.

It should be noted that while the above describes calling the tenant service for each request, in an example embodiment, this can be avoided by pre-loading a tenant service instance mapping into memory at application bootstrap.

FIG. 5 is a diagram illustrating an example tenant registry 500, in accordance with an example embodiment. The tenant registry 500 may be used by the tenant service 406 to keep track of which tenants have been assigned which service. Specifically, for each combination of application, tenant, and service, a different row in the registry 500 is provided. Each row may store, for the combination of tenant and service, an identification 502 of the application, an identification of the space 504 in which the application resides, an identification of the tenant 506, an identification of the service 508, an identification of the service instance 510, a credential 512, and a scope 514.

Additionally, if a tenant is deleted, the tenant service deletes instances of the tenant in the tenant registry 500, which also acts to delete the service instances related to the tenant.

Figure 6:
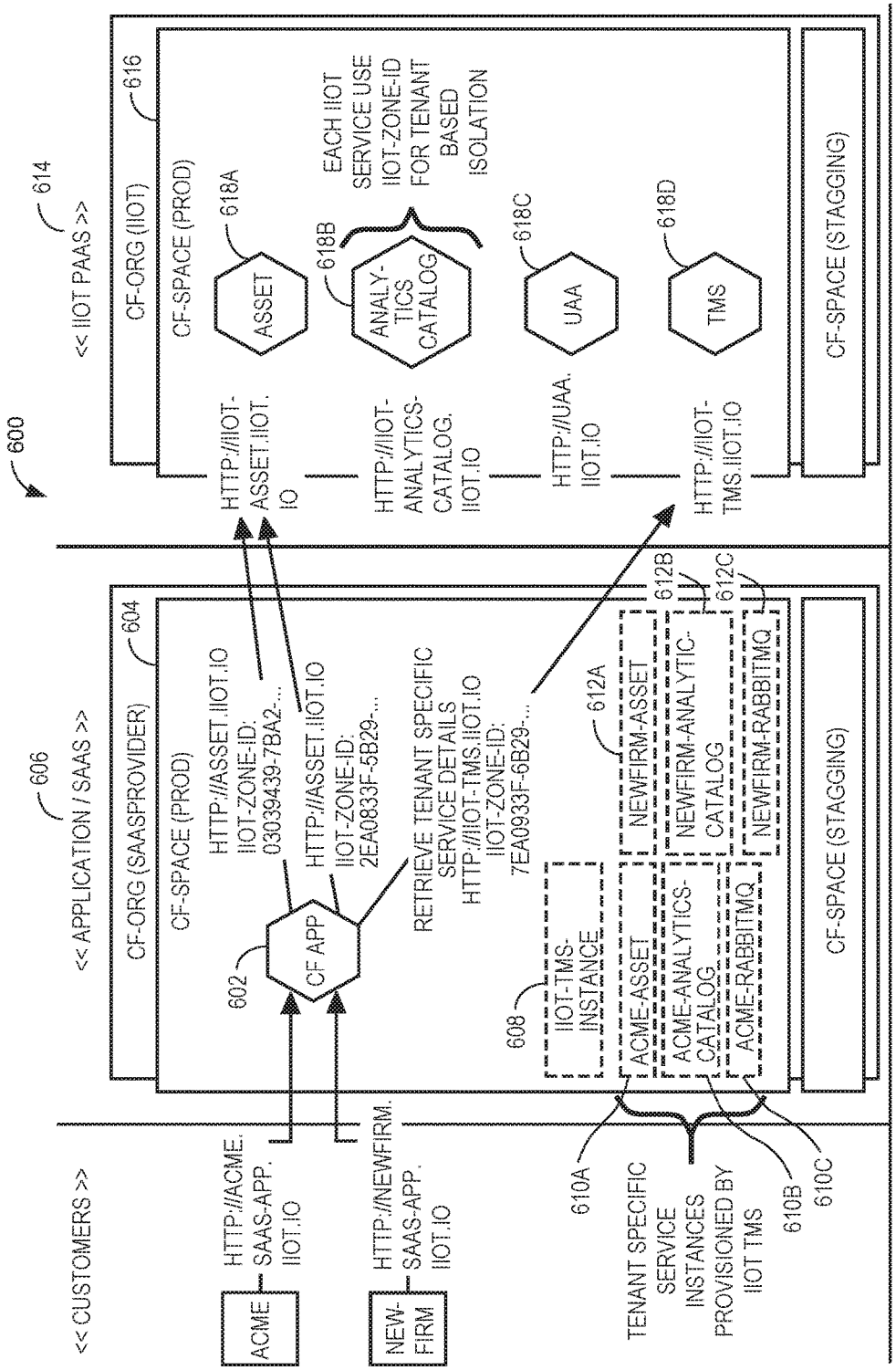
FIG. 6 is a block diagram illustrating an IIoT architecture, in accordance with an example embodiment.

FIG. 6 is a block diagram illustrating an IIoT architecture 600, in accordance with an example embodiment. This figure presents a logical depiction of the components of the IIoT architecture 600. An application 602 resides in a space 604 on a Software-as-a-Service (SaaS) component 606. A tenant service instance 608 instantiates tenant specific services 610A-610C and 612A-612C, as described earlier, based on one or more templates set up establishing bundles of instances. A PaaS component 614 hosts its own space 616 in which various services 618A-618D are hosted. The application 602, may, for example, retrieve tenant specific service details from the tenant service 610 to use to instantiate the tenant service instance 608, which may then be used at run-time to instantiate the tenant specific services 610A-610C and 612A-612C, which then can be used to access services 618A-618C (although only accessing service 610A is depicted here).

Figure 7:
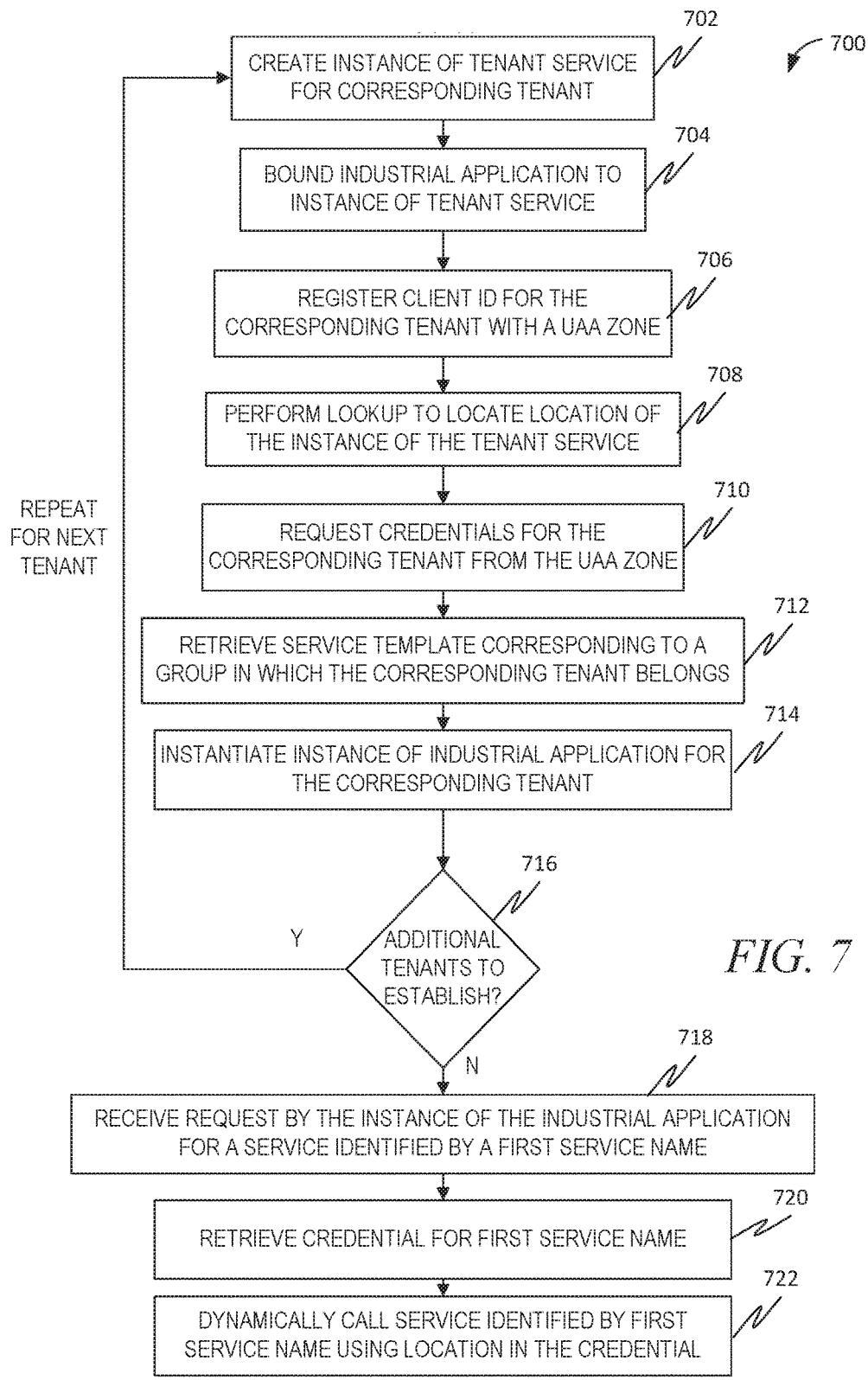
FIG. 7 is a flow diagram illustrating a method, in accordance with an example embodiment, of binding an industrial application to a plurality of services in an IIoT.

FIG. 7 is a flow diagram illustrating a method 700, in accordance with an example embodiment, of binding an industrial application to a plurality of services in an IIoT. A loop is begun for each of a plurality of tenants. At operation 702, an instance of a tenant service is created for the corresponding tenant. At operation 704, the industrial application is bound to the instance of the tenant service. At operation 706, a client identification for the corresponding tenant is registered with a UAA zone. At operation 708, a lookup is performed to locate a location of the instance of the tenant service. At operation 710, credentials for the corresponding tenant are requested from the UAA zone.

At operation 712, a service template corresponding to a group in which the corresponding tenant belongs is retrieved using the credentials. The service template contains a plurality of service identifications representing a bundle of services assigned to the group. At operation 714, an instance of the industrial application is instantiated for the corresponding tenant. At operation 716, it is determined if there are any additional tenants to establish for the industrial application. If so, then the method 700 loops back to operation 702 for the next tenant.

If not, then at operation 718, a request by the instance of the industrial application for a service identified by a first service name is detected. At operation 720, a credential is retrieved for the first service name. The credential identifies a location where an instance of the service identified by the first service name resides. At operation 722, the service identified by the first service name is dynamically called using the location.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-7 are implemented, in some embodiments, in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internee of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Soft Architecture

Figure 8:
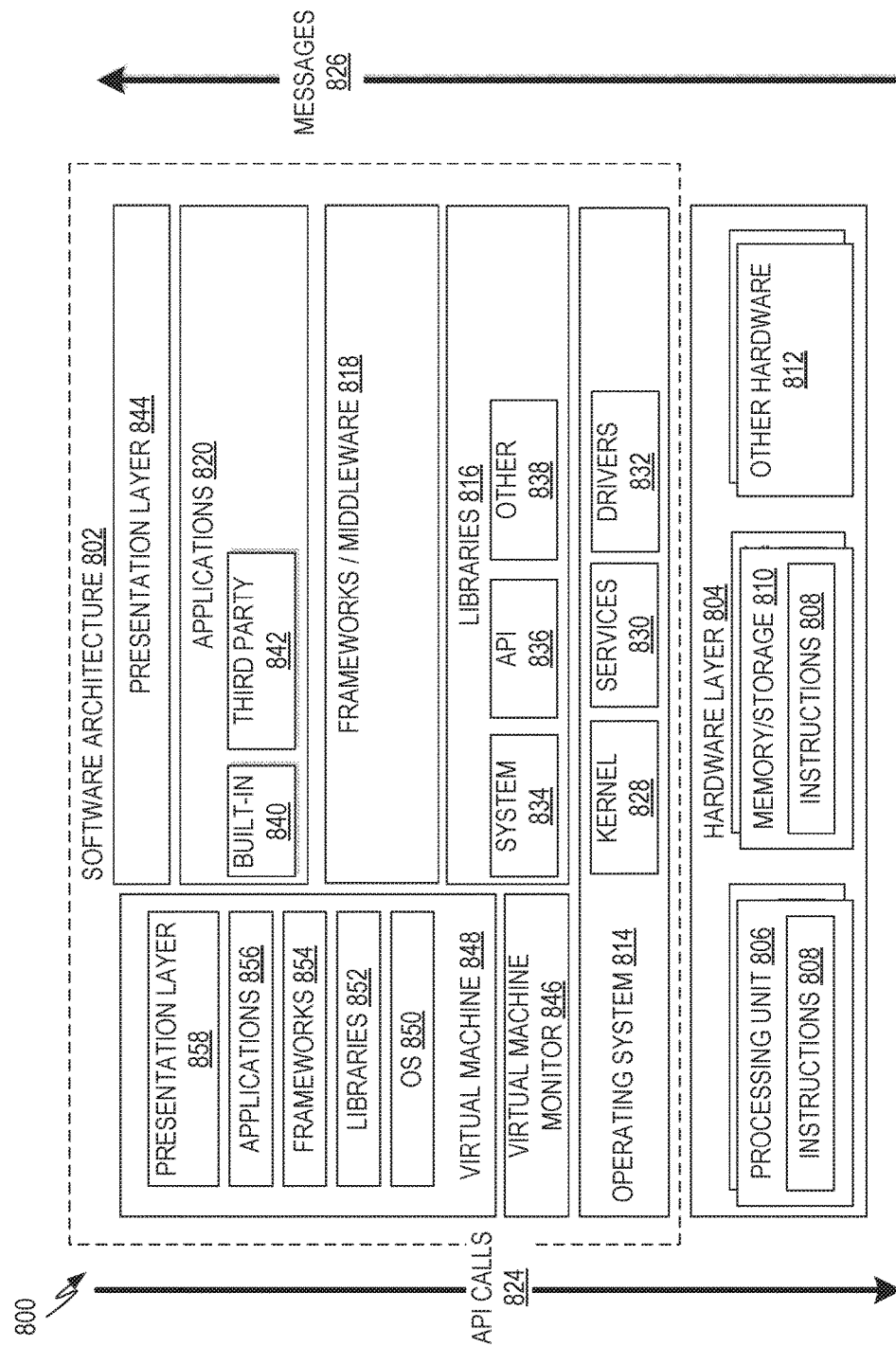
FIG. 8 is a block diagram illustrating a representative software architecture which may be used in conjunction with various hardware architectures herein described.

FIG. 8 is a block diagram 800 illustrating a representative software architecture 802, which may be used in conjunction with various hardware architectures herein described. FIG. 8 is merely a non-limiting example of a software architecture 802, and it will be appreciated that many other architectures may be implemented to facilitate the functionality described herein. The software architecture 802 may be executing on hardware such as a machine 900 of FIG. 9 that includes, among other things, processors 910, memory/storage 930, and I/O components 950. A representative hardware layer 804 is illustrated and can represent, for example, the machine 900 of FIG. 9. The representative hardware layer 804 comprises one or more processing units 806 having associated executable instructions 808. The executable instructions 808 represent the executable instructions of the software architecture 802, including implementation of the methods, modules, and so forth of FIGS. 1-7. The hardware layer 804 also includes memory and/or storage modules 810, which also have the executable instructions 808. The hardware layer 804 may also comprise other hardware 812, which represents any other hardware of the hardware layer 804, such as the other hardware illustrated as part of the machine 900.

In the example architecture of FIG. 8, the software architecture 802 may be conceptualized as a stack of layers where each layer provides particular functionality. For example, the software architecture 802 may include layers such as an operating system 814, libraries 816, frameworks/middleware 818, applications 820, and a presentation layer 844. Operationally, the applications 820 and/or other components within the layers may invoke API calls 824 through the software stack and receive a response, returned values, and so forth illustrated as messages 826 in response to the API calls 824. The layers illustrated are representative in nature, and not all software architectures have all layers. For example, some mobile or special purpose operating systems may not provide a frameworks/middleware 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 816 may provide a common infrastructure that may be utilized by the applications 820 and/or other components and/or layers. The libraries 816 typically provide functionality that allows other software modules to perform tasks in an easier fashion than to interface directly with the underlying operating system 814 functionality (e.g., kernel 828, services 830, and/or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D in a graphic context on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks/middleware 818 may provide a higher-level common infrastructure that may be utilized by the applications 820 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be utilized by the applications 820 and/or other software components/modules, some of which may be specific to a particular operating system or platform.

The applications 820 include built-in applications 840 and/or third-party applications 842. Examples of representative built-in applications 840 may include, but are not limited to, a contacts application, a browser application, a book reader application, a location application, a media application, a messaging application, and/or a game application. Third-party applications 842 may include any of the built-in applications 840 as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 842 may invoke the API calls 824 provided by the mobile operating system such as the operating system 814 to facilitate functionality described herein.

The applications 820 may utilize built-in operating system functions kernel 828, services 830, and/or drivers 832), libraries (e.g., system libraries 834, API libraries 836, and other libraries 838), and frameworks/middleware 818 to create user interfaces to interact with users of the system. Alternatively, or additionally, in some systems, interactions with a user may occur through a presentation layer, such as the presentation layer 844. In these systems, the application/module "logic" can be separated from the aspects of the application/module that interact with a user.

Some software architectures utilize virtual machines. In the example of FIG. 8, this is illustrated by a virtual machine 848. A virtual machine creates a software environment where applications/modules can execute as if they were executing on a hardware machine (such as the machine 900 of FIG. 9, for example). The virtual machine 848 is hosted by a host operating system (operating system 814 in FIG. 8) and typically, although not always, has a virtual machine monitor 846, which manages the operation of the virtual machine 848 as well as the interface with the host operating system (i.e., operating system 814). A software architecture executes within the virtual machine 848, such as an operating system 850, libraries 852, frameworks/middleware 854, applications 856, and/or a presentation layer 858. These layers of software architecture executing within the virtual machine 848 can be the same as corresponding layers previously described or may be different.

Example Machine Architecture and Machine-Readable Medium

Figure 9:
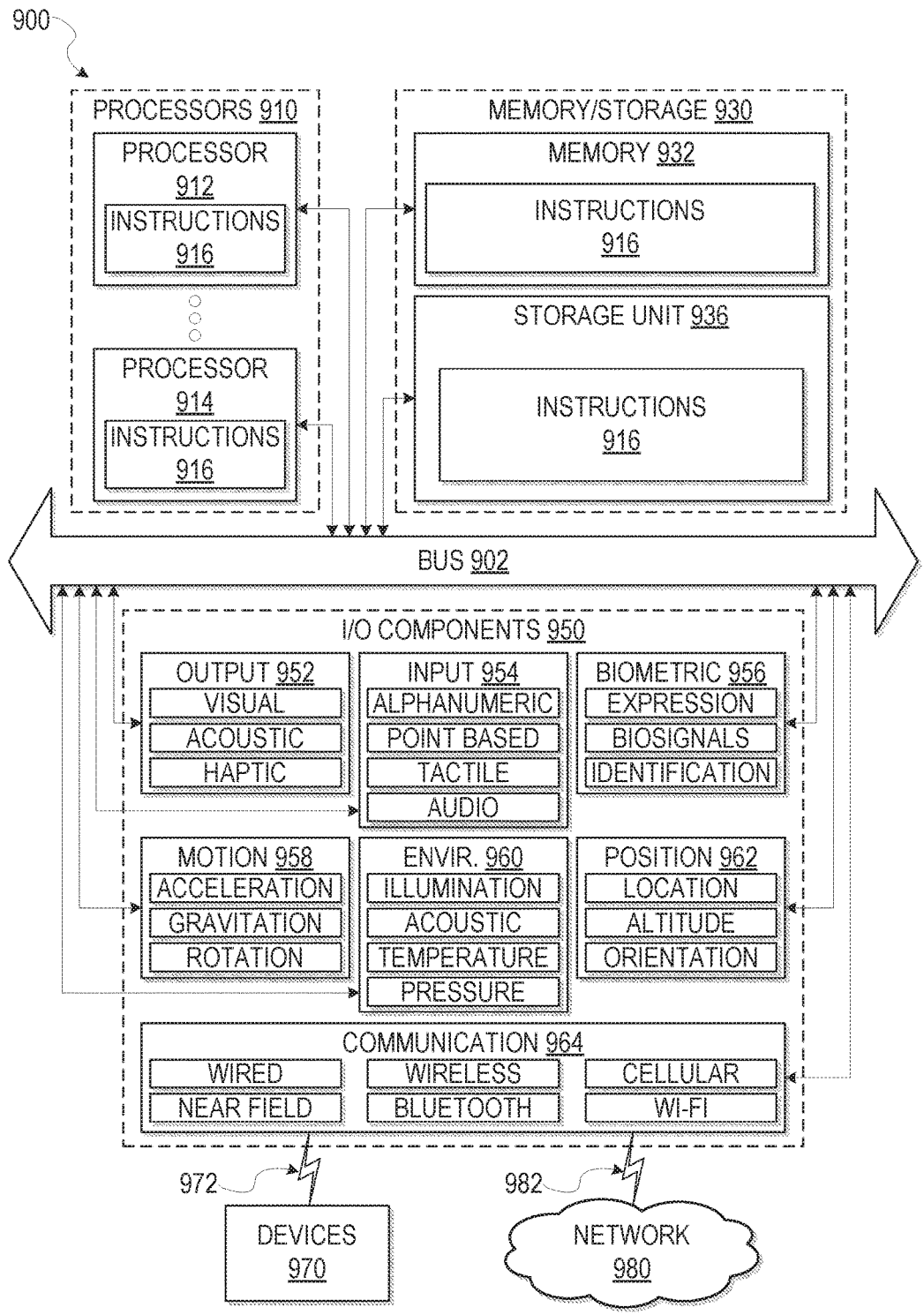
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions 916 from a machine-readable medium (e.g., a machine-readable storage medium) and perform any one or more of the methodologies discussed herein. Specifically, FIG. 9 shows a diagrammatic representation of the machine 900 in the example form of a computer system, within which the instructions 916 (e.g., software, a program, an application, an applet, an app, or other executable code) for causing the machine 900 to perform any one or more of the methodologies discussed herein may be executed. For example, the instructions 916 may cause the machine 900 to execute the flow diagram of FIGS. 2-3. Additionally, or alternatively, the instructions 916 may implement modules of FIG. 1, and so forth. The instructions 916 transform the general, non-programmed machine 900 into a particular machine programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory/storage 930, and I/O components 950, which may be configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) may include, for example, a processor 912 and a processor 914 that may execute the instructions 916. The term "processor" is intended to include a multi-core processor 912, 914 that may comprise two or more independent processors 912, 914 (sometimes referred to as "cores") that may execute the instructions 916 contemporaneously. Although FIG. 9 shows multiple processors 910, the machine 900 may include a single processor 912, 914 with a single core, a single processor 912, 914 with multiple cores (e.g., a multi-core processor 912, 914), multiple processors 912, 914 with a single core, multiple processors 912, 914 with multiples cores, or any combination thereof.

The memory/storage 930 may include a memory 932, such as a main memory, or other memory storage, and a storage unit 936, both accessible to the processors 910 such as via the bus 902. The storage unit 936 and memory 932 store the instructions 916 embodying any one or more of the methodologies or functions described herein. The instructions 916 may also reside, completely or partially, within the memory 932, within the storage unit 936, within at least one of the processors 910 (e.g., within the cache memory of processor 912, 914), or any suitable combination thereof, during execution thereof by the machine 900. Accordingly, the memory 932, the storage unit 936, and the memory of the processors 910 are examples of machine-readable media.

As used herein, "machine-readable medium" means a device able to store the instructions 916 and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions 916, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 950 may include a wide variety of components to receive input, provide output, produce output, transmit information, exchange information, capture measurements, and so on. The specific I/O components 950 that are included in a particular machine 900 will depend on the type of machine 900. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion, and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972 respectively. For example, the communication components 964 may include a network interface component or other suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NEC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method of binding an industrial application to a plurality of services in an Industrial Internet of Things (IIoT), comprising:
   for each of a plurality of tenants:
   creating an instance of a tenant service for the corresponding tenant;
   binding the industrial application to the instance of the tenant service;
   registering a client identification for the corresponding tenant with a user account and authentication (UAA) zone;
   performing a lookup to locate a location of the instance of the tenant service;
   requesting credentials for the tenant from the UAA zone using the client identification;
   retrieving a service template corresponding to a group in which the corresponding tenant belongs, the service template containing a plurality of service identifications representing a bundle of services assigned to the group;
   wherein each of the services in the bundle of service is a service related to an industrial asset or machine, each of the services being one of an asset service or an analytics service;
   wherein the asset services relate to interactions with asset models that model industrial assets, and the analytic services relate to interactions with analytics that evaluate and create insights with respect to the industrial assets;
   instantiating an instance of the industrial application for the corresponding tenant;
   at runtime of an instance of the industrial application:
   detecting a request by the instance of the industrial application for a service identified by a first service name;
   retrieving an electronic credential for the service name, the credential identifying an electronic address where an instance of the service identified by the first service name resides; and
   dynamically calling the service identified by the first service name using the electronic address such that the application need not be restarted for a binding to take effect.

2. The method of claim 1, wherein the service template additionally includes a plurality of service plans.

3. The method of claim 1, wherein the instance of the tenant service for each of the plurality of tenants accesses a tenant registry that tracks which tenants have been assigned which service.

4. The method of claim 1, wherein the industrial application operates on an IIoT cloud to provide access to data gathered by an IIoT machine coupled to a physical industrial machine.

5. The method of claim 4, wherein the data gathered includes time series data captured by one or more sensors on the physical industrial machine.

6. A system comprising:
   an instance of an IIoT application operating on an IIoT cloud, the IIoT application coupled to an IIoT machine gathering data from a physical industrial machine not located on the IIoT cloud;
   an instance of a tenant service corresponding to a first tenant of the industrial application, the instance of the tenant service executable by one or more processors and configured to:
   use a template identified by the industrial application to provision the first tenant with the instance of the industrial application, the service template containing a plurality of service identifications representing a bundle of services assigned to a group in which the first tenant belongs;
   wherein each of the services in the bundle of service is a service related to an industrial asset or machine, each of the services being one of an asset service or an analytics service;
   wherein the asset services relate to interactions with asset models that model industrial assets, and the analytic services relate to interactions with analytics that evaluate and create insights with respect to the industrial assets;
   detect a request by the instance of the industrial application for a service identified by a first service name;
   send an electronic credential for the service name to the instance of the industrial application, the credential identifying an electronic address where an instance of the service identified by the first service name resides, the credential established using the service template; and
   the IIoT application executable by one or more processors and configured to:
   dynamically call the service identified by the first service name using the electronic address such that the application need not be restarted for a binding to take effect;
   wherein a different instance of the tenant service is created for each tenant of the industrial application and bound to the instance of the industrial application;

wherein a location of the instance of the tenant service is identified by the instance of the industrial application by performing a lookup.

7. The system of claim 6, wherein the service template additionally includes a plurality of service plans.

8. The system of claim 6, wherein the instance of the tenant service accesses a tenant registry that tracks which tenants have been assigned which service.

9. The system of claim 6, wherein the instance of the industrial application operates on an IIoT cloud to provide access to data gathered by an IIoT machine coupled to a physical industrial machine.

10. The system of claim 9, wherein the data gathered includes time series data captured by one or more sensors on the physical industrial machine.

11. A non-transitory machine-readable storage medium comprising instructions, which when implemented by one or more machines, cause the one or more machines to perform operations, the operations comprising:

for each of a plurality of tenants:
creating an instance of a tenant service for the corresponding tenant;
binding the industrial application to the instance of the tenant service;
registering a client identification for the corresponding tenant with a user account and authentication (UAA) zone;
performing a lookup to locate a location of the instance of the tenant service;
requesting credentials for the tenant from the UAA zone using the client identification;
retrieving a service template corresponding to a group in which the corresponding tenant belongs, the service template containing a plurality of service identifications representing a bundle of services assigned to the group;

wherein each of the services in the bundle of service is a service related to an industrial asset or machine, each of the services being one of an asset service or an analytics service;

wherein the asset services relate to interactions with asset models that model industrial assets, and the analytic services relate to interactions with analytics that evaluate and create insights with respect to the industrial assets;

instantiating an instance of the industrial application for the corresponding tenant;

at runtime of an instance of the industrial application:
detecting a request by the instance of the industrial application for a service identified by a first service name;
retrieving an electronic credential for the service name, the credential identifying an electronic address where an instance of the service identified by the first service name resides; and
dynamically calling the service identified by the first service name using the electronic address such that the application need not be restarted for a binding to take effect.

12. The non-transitory machine-readable storage medium of claim 11, wherein the service template additionally includes a plurality of service plans.

13. The non-transitory machine-readable storage medium of claim 11, wherein the instance of the tenant service for each of the plurality of tenants accesses a tenant registry that tracks which tenants have been assigned which service.

14. The non-transitory machine-readable storage medium of claim 11, wherein the industrial application operates on an IIoT cloud to provide access to data gathered by an IIoT machine coupled to a physical industrial machine.

* * * * *